(12) United States Patent
Herndon (10) Patent No.: US 9,965,737 B2
(45) Date of Patent: May 8, 2018

(54) MULTICHANNEL DISTRIBUTION MANAGEMENT TOOL, SYSTEM AND METHOD

(71) Applicant: iDive Pty Ltd, Kirribilli NSW (AU)

(72) Inventor: Melinda Herndon, North Sydney (AU)

(73) Assignee: iDive Pty Ltd, Kirribilli NSW (AU)

( * ) Notice: Subject to any disclaimer, the term of this patent is extended or adjusted under 35 U.S.C. 154(b) by 185 days.

(21) Appl. No.: 14/037,308

(22) Filed: Sep. 25, 2013

(65) Prior Publication Data

US 2014/0089147 A1 Mar. 27, 2014

(30) Foreign Application Priority Data

Sep. 27, 2012 (AU) ................................ 2012904231
Apr. 12, 2013 (AU) ................................ 2013204166

(51) Int. Cl.
| | | |
|---|---|---|
| *G06Q 10/00* | (2012.01) | |
| *G06Q 10/08* | (2012.01) | |
| *G06Q 30/06* | (2012.01) | |
| *G06K 7/10* | (2006.01) | |

(52) U.S. Cl.
CPC ......... *G06Q 10/08* (2013.01); *G06K 7/10366* (2013.01); *G06Q 10/083* (2013.01); *G06Q 10/087* (2013.01); *G06Q 30/06* (2013.01); *G06Q 30/0635* (2013.01)

(58) Field of Classification Search
CPC .... G06Q 10/087; G06Q 10/083; G06Q 30/06; G06Q 30/0635; G06K 7/10366
USPC .......................................................... 705/28
See application file for complete search history.

(56) References Cited

U.S. PATENT DOCUMENTS

| | | |
|---|---|---|
| 6,601,764 B1 | 8/2003 | Goodwin, III |
| 6,996,538 B2 | 2/2006 | Lucas |
| 7,267,270 B2 | 9/2007 | Hopwood et al. |
| 8,001,017 B1 | 8/2011 | Franco |
| 2003/0055710 A1 | 3/2003 | Burk et al. |
| 2003/0227392 A1* | 12/2003 | Ebert ................. G06K 17/00 340/8.1 |

(Continued)

OTHER PUBLICATIONS

Smit, Philip. A Phenomenological Examination of Supply Chain Professionals' Experiences to Improve Cash-to-Cash Positioning Walden University, ProQuest Dissertations Publishing, 2012.*

*Primary Examiner* — Florian M Zeender
(74) *Attorney, Agent, or Firm* — Matthew C. Lapple; Lapple Ubell IP Law, LLP (57) ABSTRACT

A new or alternative computer-enabled multichannel distribution management tool, system and method that facilitate multi-channel distribution management of product to the market. The tool, method and system allow manufacturers management of transactions across all distribution channels and throughout the distribution chain, including to the "tail end" of the distribution chain after sale to an end consumer, where manufacturer liability remains (e.g. for returns or warranty repairs or servicing). This facilitates the calculation of "true" profits for manufacturers, based on pre- and post-sales data (e.g. costs associated with the sale of each widget through any given distribution channel). The multi-channel distribution management tool also provides distributors and retailers a centralized tool to manage transactions downstream from their relative positions in the distribution chain.

24 Claims, 5 Drawing Sheets

(56) References Cited

U.S. PATENT DOCUMENTS

2011/0264594 A1* 10/2011 Govindaraju .......... G06Q 30/06
705/302

* cited by examiner

MULTICHANNEL DISTRIBUTION MANAGEMENT TOOL, SYSTEM AND METHOD

CROSS-REFERENCE TO RELATED APPLICATIONS

This application claims priority to Australian Provisional Patent Application No. 2012904231, filed on Sep. 27, 2012, and Australian Standard Patent Application No. 2013204166, filed on Apr. 12, 2013, the contents of both of which are hereby incorporated by reference.

FIELD OF THE INVENTION

The present invention relates to methods, systems and tools for managing the distribution chain.

BACKGROUND

The distribution chain can be viewed as that part of the supply chain from a manufacturer (producer) through its customers (e.g. wholesalers, retailers) to an end consumer. It involves the various business processes a manufacturer must undertake to get a product (goods or services) to the end consumer. In this sense, it is concerned primarily with those parts of the supply chain that are downstream from the manufacturer.

The distribution chain suffers a number of inefficiencies—particularly in relation to the distribution of physical goods. This includes the need to get defect-free products quickly and reliably to the consumer. Traditionally this has involved distributing product through distribution channels (e.g. retailers) so that consumers can purchase and collect (or have delivered) product from a conveniently located distribution channel. This model has shifted with the emergence of online (e.g. internet, mobile telephony) distribution but physical retail represents a significant (and still the dominant) form of distribution to end consumers.

The timely and reliable delivery of product to end consumers remains a challenge. Further, a significant inefficiency of the distribution chain is the holding of items in inventory. The risk of lost sales due to lack of inventory needs to be balanced against the significant costs and risks of holding excess inventory in a warehouse or on a store shelf. Managing these risks requires close co-ordination of a manufacturer with its chosen distribution channels.

One of the complicating factors in managing these risks is the emergence of omni-channel distribution. Put another way, the "breadth" of the distribution chain poses challenges because most manufacturers today need to distribute through a range of distribution channels (e.g. stores, web, mobile) and must carefully co-ordinate business processes to ensure seamless and efficient supply across all distribution channels.

Yet another complication is the increased globalization of product markets. The "depth" of the distribution chain has also increased, with international demand for products posing different challenges to manufacturers in terms of timely and cost-efficient delivery of inventory.

It is a challenge for manufacturers, particularly small manufacturers with limited resources to develop custom-built solutions or to manage in-house all the transactions across this expanded breadth and depth of the distribution chain. Different types of distribution channel (e.g. wholesale, retail) may pose different challenges along the distribution chain. However, a manufacturer must be able to manage these challenges and optimize its business processes to deliver product efficiently to consumers. With the level of competition in the marketplace, it is also critically important for manufacturers to handle these processes efficiently as part of building and maintaining value in their brand(s).

Inventory management systems such as the one disclosed in U.S. Pat. No. 6,601,764 allow the tracking of inventory (time on shelf and item location information) but do not assist manufacturers to manage other transactions in the distribution chain. The inability to manage the entire distribution chain represents a potential loss or leakage of profit through, for example:

a. failure to adequately forecast production to minimise disruption in supply where demand is high or excess inventory where demand is low; or     b. failure to properly record or track returns or warranty repairs from each distribution channel.

U.S. Pat. No. 8,001,017 discloses an internet-based supply-chain management system that manages a number of transactions across the supply chain. U.S. Pat. No. 8,001,017 claims to reduce transportation costs, predict future consumption, facilitate promotion and advertising, reduce overall supply-chain costs, and save consumers time and money. However, key features of U.S. Pat. No. 8,001,017 include an aggregation of purchases by consumers and of inventory by merchants, both of which can disadvantage manufacturers.

This is because the system of U.S. Pat. No. 8,001,017 includes an order aggregation facility that involves physically aggregating a consumer's orders from a number of merchants and shipping those orders together. This delivery model is subject to the delays of the slowest merchant, and thus may adversely impact the reputation of a brand owner (whether manufacturer or merchant) through no fault of the brand owner. Further, the efficient delivery to an end consumer minimizes the benefit to an individual brand owner because of the aggregated nature of the delivery—indeed, success may be viewed as being the result of an efficient carrier or transport company, or of the operator of the order aggregation facility. As such it benefits inefficient manufacturers and disadvantages efficient ones.

Another disadvantage of U.S. Pat. No. 8,001,017 is the aggregation of inventory by merchants (through the creation of a virtual inventory pool shared by merchants), which reduces the amount of inventory held across the distribution chain to essentially the amount of inventory in transport.

While reducing the amount of inventory may translate to cost savings by consumers, this approach relies heavily on accurate forecasting and the careful co-ordination of transportation. The risk is that unless transportation processes are tightly controlled by manufacturers (and most small manufacturers will not be in a position to do so), availability across the distribution chain can be severely and adversely impacted by sudden, dramatic changes in demand or disruptions in transportation. Further, there is a risk of a lack of supply across a manufacturer's entire distribution chain in the event that either forecasting or transportation is unreliable. This poses particular difficulty for goods with significant manufacturing lead times (e.g. goods that need to be shipped internationally).

Therefore, a disadvantage of the system of U.S. Pat. No. 8,001,017 is that it claims to deliver benefit to end consumers but does so at potential risk to manufacturers and without assisting manufacturers to manage transactions in the distribution chain in the context of omni-channel distribution.

Neither U.S. Pat. No. 6,601,764 nor U.S. Pat. No. 8,001,017 provides a system that allows a manufacturer to manage transactions throughout the distribution chain right through until after any liability to a customer ceases (e.g. liability from defective goods, refunds or warranty repairs) in the context of omni-channel distribution. Current supply chain or distribution management systems ignore the tail end of the distribution chain, after sale to an end consumer. However, failing to record, report, forecast and account liabilities for returns, refunds and warranty repairs can result in a significant leakage of profits for any manufacturer.

An important challenge of the distribution chain faced by manufacturers today is the need to manage consumer demand and expectations in relation to returns or refunds (returned merchandise authorizations or RMAs). In the end, manufacturers only benefit through the delivery of non-defective product to the market and by having efficient systems in place to manage RMAs (including returns for repair or refund, and warranty repairs). This is an important part of brand protection. For a manufacturer, the opportunity to make profit in relation to a single item lasts up to the point of purchase. However, a liability for RMAs exists well into the product lifecycle—for a significant period of time after purchase.

This is particularly the case, with the rising popularity of "extended" warranties. Even without an extended warranty, consumer protection laws in many parts of the world oblige manufacturers to repair or refund goods for a period after purchase.

Having a distribution chain management tool that would allow centralized management (e.g. recording and tracking RMAs and details of RMAs) of RMAs for omni-channel distribution, as well as transactions throughout the distribution chain beyond the point of sale to an end consumer, would allow manufacturers to maximize profit by more effectively managing loss or leakage of profits.

There is a need for a multi-channel distribution management tool, method and system that facilitates the multi-channel distribution of product by a manufacturer, including managing RMAs and other transactions with the market.

It is an object of the present invention to provide a multichannel distribution management tool that facilitates the multi-channel distribution of product to the market throughout the distribution chain for the life of product liability to an end consumer.

SUMMARY

According to an aspect of the invention there is provided a computer enabled multichannel distribution management tool for facilitating multi-channel distribution of one or more products, the tool including programming instructions embodied in machine readable memory, wherein the multichannel distribution management tool includes:
 a. a stock keeping unit (SKU)-lifecycle tracker,
 b. wherein the SKU-lifecycle tracker comprises programming instructions to:
  i. generate a SKU-lifecycle tracker code for marking a widget, the SKU-lifecycle tracker code including a unique identifier (Widget Unique ID) for each said widget produced by a manufacturer, wherein each said widget is a billable item within a purchase order; and
  ii. access product and transaction data when said product and transaction data becomes available, and
  iii. tie said product and transaction data to the SKU-lifecycle tracker code c. such that the multichannel distribution management tool is configured to track each widget throughout its product lifecycle, and
 d. wherein the multichannel distribution management tool allows information to be accessible to one or more parties within a product distribution chain by reference to the SKU-lifecycle tracker code such that the multichannel distribution management tool is capable of managing and tracking transactions relating to one or more widgets within a product distribution chain, including beyond delivery to an end consumer.

According to another aspect of the invention, there is provided a computer-enabled multichannel distribution management method, the method being performed by a multichannel distribution management tool and including the steps of:
 a. assigning a SKU-lifecycle tracker code for each widget produced by a manufacturer, wherein each said widget is a billable item within a purchase order, and
  i. wherein the SKU-lifecycle tracker code comprises a unique identifier (Widget Unique ID) borne by each said widget;
 b. accessing product and transaction data relating to each said widget by reference to said SKU-lifecycle tracker code when said product and transaction data becomes available;
 c. tracking each said widget throughout its product lifecycle by reference to each widget's SKU-lifecycle tracker code, wherein said tracking includes tracking beyond delivery to an end consumer.

According to yet another embodiment, there is provided a multichannel distribution management system including:
 a. a multichannel distribution management tool as herein described below; and
 b. a multichannel distribution method as herein described below, wherein the multichannel distribution method is performed by the multichannel distribution management tool, and wherein one or more components of the multichannel distribution tool comprises one of:
  i. a software as a service application;
  ii. a platform as a service application;
  iii. an infrastructure as a service application.

BRIEF DESCRIPTION OF THE DRAWINGS

The invention thus provides a new or alternative multi-channel distribution management tool, system and method that facilitate multi-channel distribution management of product to the market.

For a better understanding of the invention and to show how it may be performed, preferred embodiments will now be described, by way of non-limiting examples only, with reference to the accompanying drawings.

The elements of the invention are now described under the following headings:

DETAILED DESCRIPTION OF THE PREFERRED EMBODIMENTS

The invention provides a new or alternative computer-enabled multichannel distribution management tool, method and system that facilitates the multi-channel distribution of product to the market.

Multichannel Distribution Management Tool

Figure 1:
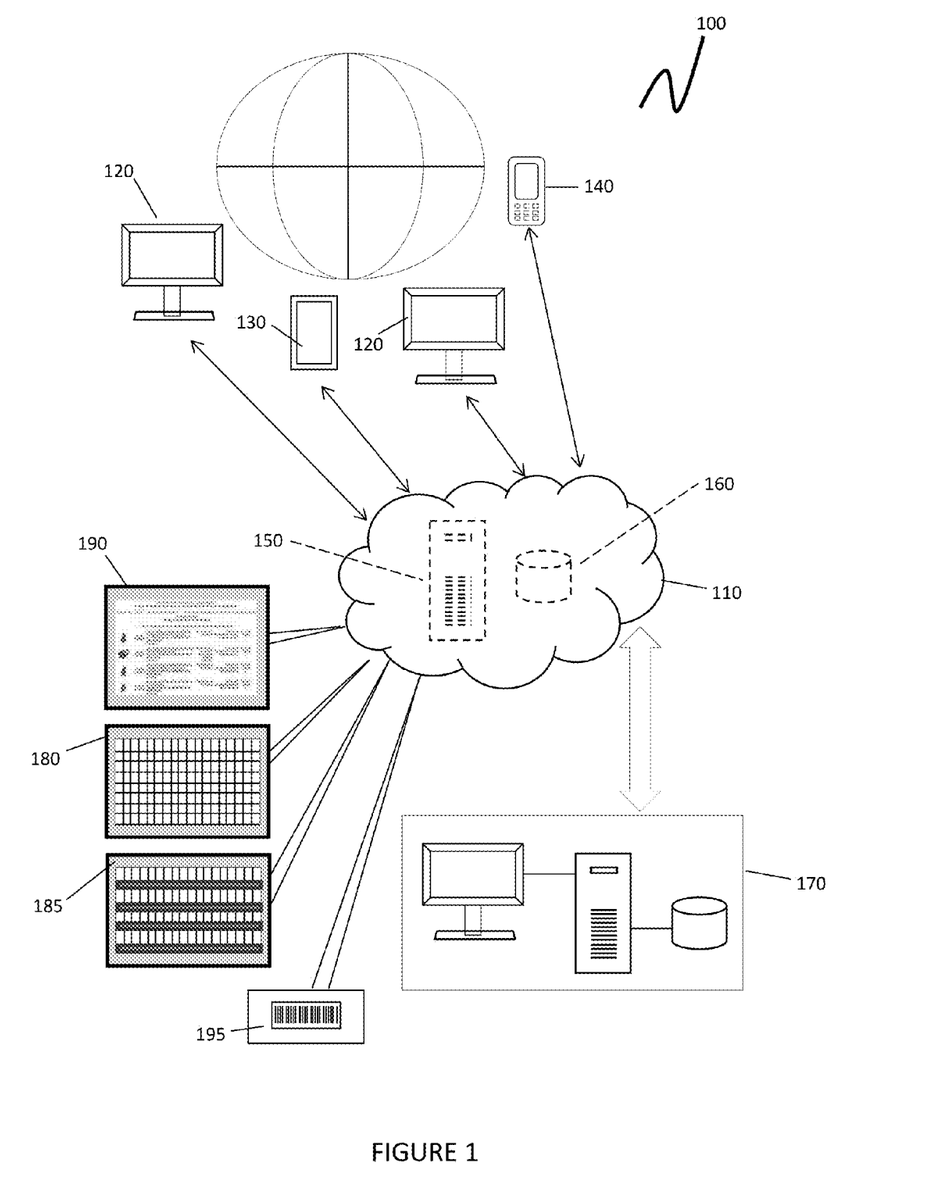
FIG. 1 is a schematic block diagram showing a multi-channel distribution management tool according to an embodiment of the invention. Items depicted using dashed lines are components of an embodiment of a multichannel distribution management system.

Referring to FIG. 1, a preferred embodiment of the multichannel distribution management tool 100 is shown, in which the multichannel distribution management tool comprises enterprise-class software delivered via a "software as a service" (SaaS) delivery model. The multichannel distribution management tool 100 is centrally hosted in the cloud 110, on the internet or other computer network. The double headed arrows schematically show delivery of the multichannel distribution management tool 100 as a service accessible via cloud computing (over the internet or other computer network). As such, the multichannel distribution management tool 100 is accessible worldwide via any connected device (e.g. personal computer 120, tablet 130, smartphone 140) and can be used by various parties in a manufacturer's distribution chain.

The multichannel distribution management tool 100 allows various reports to be generated and accessed by a manufacturer. The manufacturer can also provide selected access to specified reports to its distributors and distribution partners (retailers) across its various distribution channels.

In this way, the multichannel distribution management tool 100 is a centralized tool allowing manufacturers management of transactions across all distribution channels and throughout the distribution chain, including to the "tail end" of the distribution chain after sale to an end consumer, where manufacturer liability remains (e.g. for returns or warranty repairs or servicing).

This facilitates the calculation of "true" profits for manufacturers, based on pre- and post-sales data (e.g. costs associated with the sale of each widget through any given distribution channel). The multichannel distribution management tool 100 includes an algorithm that calculates "true" profit, by deducting gross costs (including ongoing liabilities including post-sales returns, repair and warranty servicing costs) and customer relationship management (CRM) costs from gross revenues.

The multichannel distribution management tool 100 also provides distributors and retailers a centralised tool to manage transactions downstream from their relative positions in the distribution chain. This allows recording, tracking, analysis and reporting of transactions involving a specified manufacturer's goods, from wholesale sales data to retail (end customer) data, order histories and tracking, and returned merchandise authorizations (RMAs) for warranty repairs, refunds or servicing.

The multichannel distribution management tool 100 includes programming instructions to enable performance of a method for multichannel distribution management.

Multichannel Distribution Management System

The invention also provides a multichannel distribution management system. In a preferred embodiment, the multichannel distribution system includes:

a. a multichannel distribution management tool (described above); and     b. a SKU-lifecycle tracker.

In an embodiment of a multichannel distribution management system, various components in addition to the multichannel distribution management tool may also be delivered via cloud computing (e.g. software bundles, services or storage as "Infrastructure as a Service" [IaaS] or a database of distribution transactions as "Platform as a Service" [PaaS]).

Exemplary components of the multichannel distribution management system are illustrated schematically in FIG. 1 as item 150 (storage as an Iaas) and item 160 (database as a PaaS). The box labelled 170 in FIG. 1 is a schematic illustration of a manufacturer using a computer to access a hosted multichannel distribution management tool 100.

SKU-Lifecycle Tracker

Figure 2:
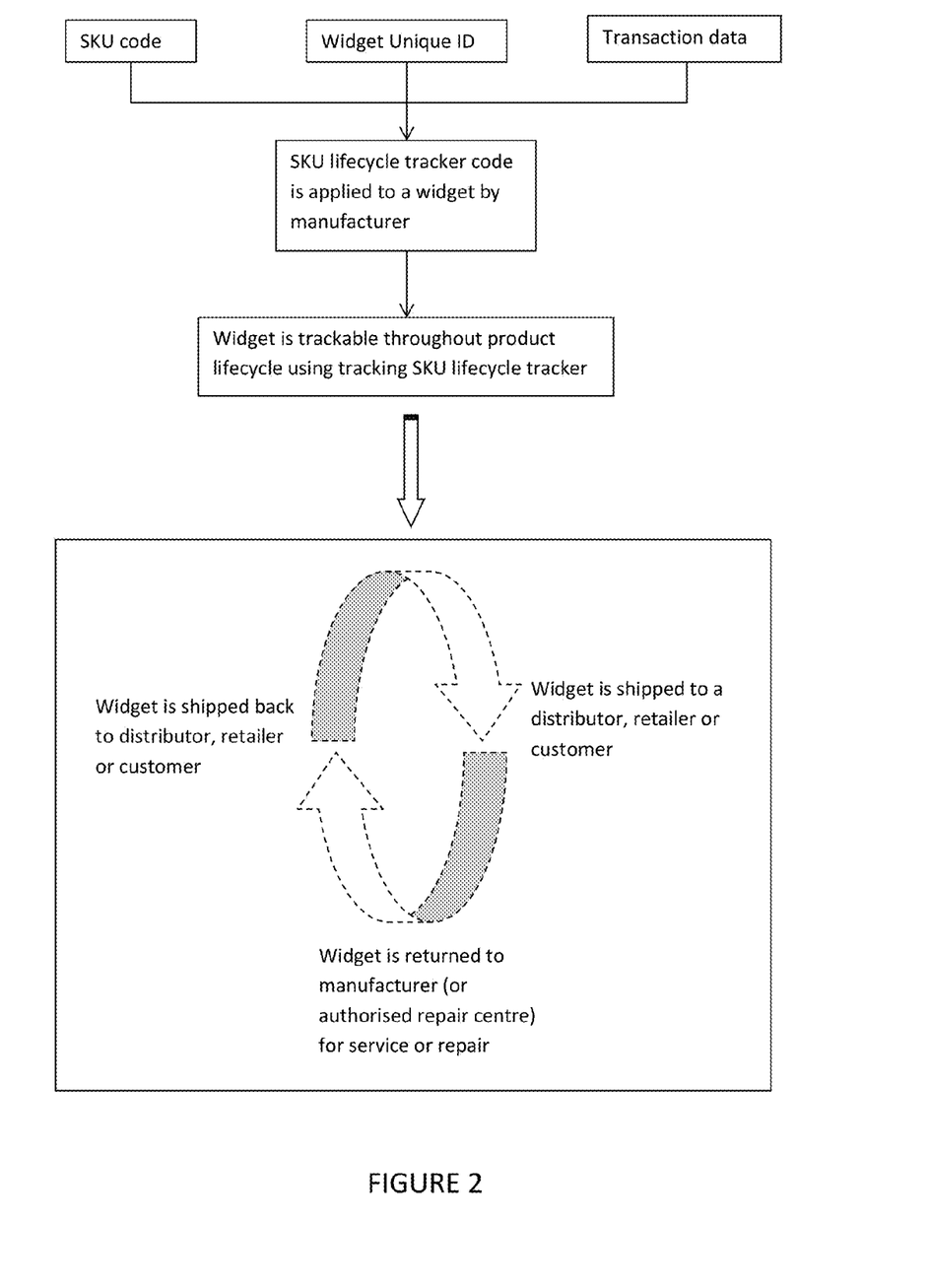
FIG. 2 shows a schematic illustration of a method performed by a SKU-lifecycle tracker according to an embodiment.

In an embodiment, the multichannel distribution management system includes a SKU-lifecycle tracker (refer FIG. 2).

The SKU-lifecycle tracker generates a SKU-lifecycle tracker code that is unique for every billable item (widget) produced and shipped by a manufacturer. The SKU-lifecycle tracker also enables access to data from the multichannel distribution management system involving product details (data) and transaction data. In this way, the SKU lifecycle tracker code is enabled to function as a lifecycle identifier of a product and can be used to manage and track transactions within the distribution chain—even beyond delivery to an end consumer.

SKU Lifecycle Tracker Code

The SKU-lifecycle tracker code is encoded with:

a. a unique identifier (Widget Unique ID) for each billable item (hereafter, widget) produced by a manufacturer;

b. relevant transaction data involving a specific Widget Unique ID; and     c. product data.

The SKU-lifecycle tracker code may take any suitable form, such as a barcode (e.g. depicted as item 195 in FIG. 1), a data matrix code or a matrix barcode (QR code), or any other suitable code or tag (e.g. an RFID tag). The SKU-lifecycle tracker code complies with any applicable standard (e.g. the Code 39 (AKA Code 3 of 9) standard for barcode specifications).

The multichannel distribution management system automatically generates a SKU lifecycle tracker code for each widget in a purchase order.

The manufacturer applies the SKU-lifecycle tracker code to all widgets by any suitable means (e.g. adhesive label, printing or other surface marking directly onto the widget such as through industrial ink-jet, dot-peen marking, laser marking, or electrolytic chemical etching (ECE)). These methods give a permanent mark borne by the widget, which should last for the product lifecycle of the widget.

The combination of data encoded into the SKU-lifecycle tracker code assists to detect grey market or other unauthorized selling of product, including counterfeit product.

All widgets (products or product parts) bear a SKU-lifecycle tracker code (e.g. in barcode form as depicted in FIG. 1) when they leave the manufacturer (or factory). The SKU-lifecycle tracker code consists of two key identifiers that are tied to a wealth of background information (stored in one or more databases accessible by the multichannel distribution management system):

a. the distribution's stock-keeping unit (SKU) code for the widget (whether a whole product or a part), and     b. a unique ID different for every widget (the Widget Unique ID).

The SKU code ties to a database of product data including:
a. universal product code (UPC), if available, or any other suitable code or tag containing product data;
b. weight;
c. serial number;
d. country of origin;
e. other standard product data (name, stock levels, color, size, photos, videos, etc); and
f. sales data.

The Widget Unique ID allows each widget to be tracked individually from manufacture through to the tail end of the product lifecycle (namely, beyond sale to an end consumer) and ties to one or more databases of transaction data. So if, for example, QTY 10 of one specific widget is ordered from a manufacturer, each widget can be tracked separately from the time of manufacture.

The SKU-lifecycle tracker code encodes information including both the SKU code and Widget Unique ID and ties it into product and transaction data when that information becomes available.

This allows the following information to be collected, updated and exchanged (e.g. between a manufacturer and distributor or distribution partner such as a retailer) by scanning the SKU-lifecycle tracker code:
a. where the widget is located at any point in time (e.g. manufacturer or distributor warehouse and/or shelf details, retailer warehouse and/or shelf details, or end customer address, as applicable);
b. which purchase order number applies to the widget (for example item 3 of 10 of Purchase Order 12345);
c. who receives the item (e.g. distributor, distribution partner [retailer] or end consumer);
d. if the widget is located at the manufacturer, distributor or retailer, whether the widget has been placed in a box ready to ship out, which order the widget has been put into (including box details e.g. delivery box 1 of 2 against Purchase Order 12345); and
e. whether the widget has been shipped out, or is located among a separate defective inventory;
f. when the widget is received into inventory (if destined for a distributor or retailer) or received by the end consumer, as applicable.

An advantage of the SKU-lifecycle tracker code is that the code remains with the widget for the product lifecycle. The SKU-lifecycle tracker enables a manufacturer or distribution partner (e.g. retailer) to track a widget returned for service or repair, by scanning its SKU lifecycle tracker code upon receipt from an end consumer. This information is recorded by the multichannel distribution management system and enables tracking of the widget during the repair or service, and indeed further repairs or service throughout the product lifecycle—that is, well after purchase by an end customer. This information collectively forms a product lifecycle history for each widget, including date and place of purchase, any repairs, servicing or complaints.

RMA/Routine Repair Management Facility

The multi-channel distribution management system provides a facility for RMA/routine repair management. This manages an important liability for manufacturers that can significantly impact on profit and also on a manufacturer's reputation (and brand perception) in the marketplace. Transactions involving RMAs for defective goods (whether returned by a retailer or an end consumer), warranty repairs or servicing, or simply long term servicing need to be managed carefully by a manufacturer to minimize profit leakage and brand damage through poor or inadequate transaction records.

The ability to track a widget throughout its lifecycle, from the time of manufacture right through to repairs and servicing is an advantage because with this information manufacturers can properly assess post-sale costs and the loss or leakage of profits. Improving post-sale RMA processes and transactions provides an opportunity for manufacturers to build brand loyalty, improve manufacturing and product support efficiency (e.g. by tracking performance of service centres through goods returned within a specified period of time from the time of purchase, the time of repair, or the time of service) and improve profits.

The SKU-lifecycle tracker described above facilitates the management of RMA/routine repairs by allowing each widget to be tracked well beyond sale to a consumer. At every stage during an RMA (refunds or repairs), warranty repair or product service transaction, the SKU-lifecycle tracker code for any individual widget can be recorded, updating records associated with that SKU-lifecycle tracker code and providing status, location, timing and cost repair information.

With products that require servicing for optimal performance or safety requirements (e.g. diving equipment, cameras, bicycles, car parts), this also allows the interval of manufacturer-authorized repair to be monitored, including diarized for reminders.

As with the initial delivery of a widget from the manufacturer, a distributor or retailer can record all events involving a specific SKU lifecycle tracker code and exchange that information with an end customer (to report on the status of a repair or location of a widget at any particular time). The manufacturer can record and track RMAs through all distribution channels, and provide reports and status updates back to a distributor, retailer and/or end customer. This enables the cost of such repairs to be gauged, assessed and managed, including analyzing the volume of repairs required, looking for trends in production faults or servicing, for example.

This allows manufacturers to take into account the costs associated with RMAs and other ongoing liabilities (e.g. repairs and services, warranty repairs and servicing) in assessing the true profits for any widget (as well as in relation to one or more distribution channels in a distribution chain, or in relation to any party within a specific distribution channel [including a distributor, a distribution partner or retailer, and an end consumer]).

Thus the multichannel distribution management tool allows true profits to be calculated by deducting from sales revenues the costs associated with ongoing liabilities as well as one or more of, as outlined later in this document, the costs associated with customer relationship management (CRM) and currency fluctuations.

An end customer can also access a customer view of the multi-channel distribution management tool at any time (described further below) to track the location and/or status of an RMA (i.e. a product returned for replacement, repair or servicing). This is an advantage because it reduces customer frustration with lack of information or delays in communication from a manufacturer regarding the status of an RMA.

Multi-Dimensional Web-Based Order Tracking and History Facility

In an embodiment, the multichannel distribution management tool 100 includes a multi-dimensional web-based (including cloud-based) order tracking and history facility (depicted schematically as item 180 in FIG. 1.

The multi-dimensional web-based order tracking and history facility 180 communicates with other components of the multichannel distribution management tool 100, including:

a. a distribution partner management facility (depicted schematically as item 185 in FIG. 1) to record statistics regarding distribution channels and distribution options, including sales data regarding individual distributors (or distribution partners); and b. a hosted master control panel (depicted schematically as item 190 in FIG. 1) to manage business operations online from anywhere.

The multi-dimensional web-based order tracking and history facility 180, distribution partner management facility 185 and master control panel 190 comprise programming instructions to enable user input and control of managing, tracking and analysis of product distribution transactions.

The multi-dimensional order tracking and history facility 180 is multi-dimensional in the sense that it allows:

a. manufacturers;

b. distributors (whether wholesale or retail); and/or c. customers (whether retail customers or end consumers), to manage transactions within the distribution chain, including (as appropriate) pending and past orders, order tracking, widget tracking (through the SKU-lifecycle tracker), direct sales, inventory control, order fulfillment, RMA repairs and returns management.

The "dimension" or "view" provided to the user of the order tracking and history facility 180 will vary depending on the party seeking to access information (the information seeker). Access to each "dimension" will depend on a relative position in the distribution chain of the information seeker. Access is controlled according to the respective access status applicable to the information seeker. The access status limits an information seeker's access to:

a. "internal" information, being information comprising order tracking and history data relevant to the information seeker and its own transactions; and b. "external" information, being information comprising order tracking and history data relevant to one or more downstream customers of the information seeker.

For example, a wholesale distributor will see different unit pricing than its downstream customers. Further, the order information for a retail customer will be limited to details of purchase orders it places with a wholesale distributor or directly with the manufacturer.

By contrast, a manufacturer will be able to view and track orders placed across all distribution channels in its distribution chain (also see discussion below regarding "partner management" facility). This allows overview of trending information by a manufacturer and review of performance between and across distribution channels and individual distributors (distributor partners) within a channel.

A user can toggle the dimensions to be provided with a display of data relating to any downstream party. Each "view" displays different order history and tracking data. Toggling between one or more different dimensions allows the information seeker to alternate between a display of internal information and a display of external information relating to one or more of the information seeker's downstream customers.

For example, a manufacturer can toggle between a manufacturer-dimension, a distributor-dimension, a retailer-dimension and/or an end customer-dimension. A distributor can toggle between a distributor view, the retailer view for any retailers that it sells to, and a customer view for any customers associated with retailers within its distribution chain. A retailer can see the retailer view, and its own end customer views (or end customers "credited" to that retailer—this is described in the section below entitled "Distribution partner management facility").

The multichannel distribution management tool 100 is enabled to generate one or more reports of order status reports (e.g. pending orders, order history, trending information, distributor performance), wherein the report is printable, downloadable or otherwise accessible by a user of the tool 100.

In an embodiment, the multi-dimensional order tracking and history facility 180 includes a real-time currency converter and time-stamped currency conversions to allow calculation of true profits in any given currency. This is an important aspect of international sales for any manufacturer, as the profit realized may be significantly impacted by currency fluctuations.

In an embodiment, the multi-dimensional web-based order tracking and history facility 180 also includes a multi-dimensional online returned merchandise authorisation (RMA) facility to manage and track the returns process. The RMA facility relies on data collected by the SKU-lifecycle tracker. This is an advantage because the efficient management of RMAs is critical to a manufacturer for quality control, order fulfillment and brand quality. Managing the costs and efficiency of RMAs is also important to realising true profit, as there may be profit loss or leakage through inefficient or poorly managed RMA processes—or simply through failure to record RMA costs.

The multi-dimensional nature of the online RMA facility means that:

a. a manufacturer can view all RMAs sent from various distribution channels in one "dimension" or "view"; and b. an individual distributor (or distribution partner) can view all RMAs it has sent in a separate "dimension" or "view".

This allows tracking of an individual RMA by a distributor or customer, as well as an overview of RMA statistics by a manufacturer for quality control and accounting purposes. The multichannel distribution management tool 100 is enabled to generate reports of pending RMAs and RMA history, including trending information, distributor history of RMAs, RMA costs and so on.

Predictive Ordering System

In an embodiment, the multichannel distribution management tool 100 (see FIG. 1) includes a predictive web based ordering system.

Predictive ordering allows for easy product searching and purchasing by a retail customer or end consumer. For a retail customer, for example, automatic purchase orders are generated based on user settable criteria such as: "sold since" date selections and percentages of "sold since" quantities based on whether manufacturer or retailer is heading towards or away from high season. If there is no order history to refer to, there is a special routine called "jumpstart" for new items. Jumpstart gives the user a separate view of very recent sales so the purchase order quantities can be scrutinized carefully based on human micromanagement of new stock keeping units (SKUs) until an ordering history exists.

Using the predictive web-based ordering system, a retailer who does not have a product in stock can place an order for a product on its own behalf or on behalf of a consumer. The order is placed direct with the manufacturer for delivery to the retailer or direct to a retailer's customer (an end consumer). This enables the retailer to place an order to secure a sale, even if it lacks the inventory to fulfill the order.

This is an advantage because the end consumer does not need to "shop around" for the product and the retailer does not lose the sale. A further advantage is that a retailer can sell beyond its in-store or in-warehouse inventory, meaning it can reduce inventory costs yet still provide choice for the consumer.

A consumer can also use the predictive web based ordering system to find and order product directly from the manufacturer (although the unit pricing displayed will be the retail price rather than a wholesale price). This provides convenience to the consumer and a further distribution channel for the manufacturer.

The web-based ordering system can be accessed through the retailer website (giving comfort to the consumer that the sale is through a trusted and/or local retailer) or directly through the manufacturer's website.

In an embodiment, the predictive web-based ordering system includes a sales credit process for crediting a consumer sale to a distribution partner (retailer). This may be the closest retailer to an address provided by the consumer, or a retailer nominated by the consumer. The system also provides for a default setting such that in the absence of nomination by the consumer, the retailer closest to the consumer's address or a retailer in the consumer's order history will be credited with the sale.

The sales credit process addresses the difficulty that distribution partners (retailers) view consumer sales by a manufacturer as competing directly with the retailers and potentially eroding their customer pool. The sales credit process encourages sales from retailers and rewards the respected partner relationship in light of new technology that facilitates direct to consumer sales (which offers convenience and choice to consumers).

In an embodiment, the predictive web-based ordering system also includes a system of consumer-earned credits. This is to encourage repeat sales from end customers, which assists with brand (manufacturer) loyalty.

Distribution Partner Management Facility

Referring to FIG. 1, the multichannel distribution management tool 100 also includes a distribution partner management facility 185 to record statistics and facilitate analyses regarding distribution partners.

The distribution partner management facility 185 allows the extrapolation of trending information and other analyses of distribution data, including:
  a. performance reviews between and across distribution channels and of individual distributors (distributor partners) within a channel; and
  b. management of multi-channel distribution options (refer FIG. 2 for a schematic illustration of exemplary distribution options) to determine best practices and to optimise business transactions across the distribution chain.

An advantage of the distribution partner management facility 185 is that it also allows tracking of promotional spend and discount and rebate data through each distribution channel and for each party (e.g. distributor, retailers) within a specific distribution channel. This allows calculation of the cost of making sales through various distribution channel(s) or players (e.g. how much a manufacturer has to spend with a particular distribution partner versus sales data, growth data and forecasts). This information is vital to calculating true profit but typically neglected by supply chain management systems or only dealt with in an aggregated manner (e.g. total promotional or advertising spend across various media, rather than relating to spend to a deliverable result through a specific distribution partner).

The multichannel distribution management tool 100 is enabled to generate one or more reports of distribution data (e.g. trending information, business transaction performance data, distribution channel performance data), wherein the report is printable, downloadable or otherwise accessible by a user of the tool.

Figure 3:
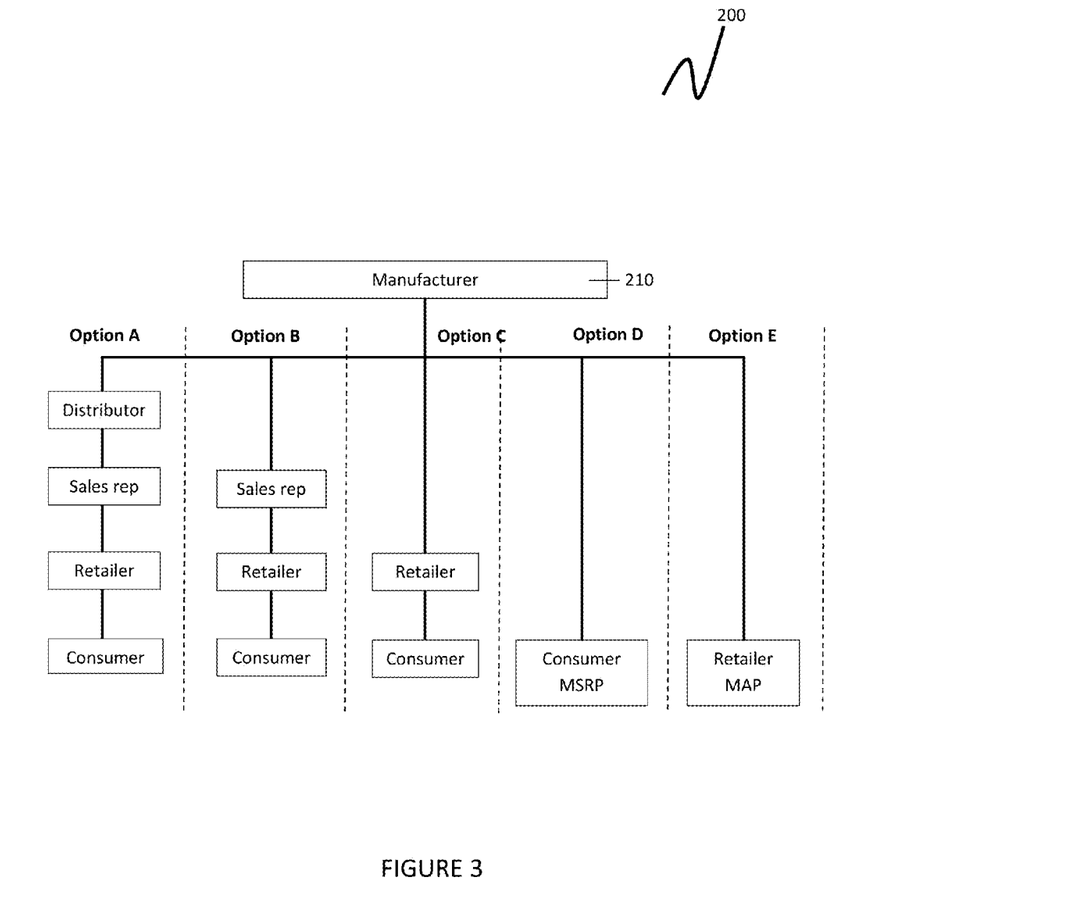
FIG. 3 shows a schematic illustration of exemplary distribution options.

Referring to FIG. 3, an exemplary multi-channel distribution chart 200 is depicted showing a plurality of distribution options. In this example, a manufacturer 210 has selected the following distribution options:
  a. option A: distributing through one or more distributor partners, whose sales representatives sell to retailers (retail customers), who re-sell to end consumers;
  b. option B: a manufacturer's sales representatives sell product to retail customers, who in turn sell to end consumers;
  c. option C: a manufacturer makes direct sales to retail customers, who sell to end consumers;
  d. option D: a manufacturer makes direct sales to end consumers at the manufacturer's suggested retail price (MSRP);
  e. option E: sales to retailers at a minimum advertised price (MAP).

The multichannel distribution management tool allows tracking of performance of each distribution option, which allows best practices to be developed to optimise cost and other efficiencies in getting product to consumers.

Manufacturers often choose to appoint international distributors for a range of reasons, including the geographical difficulties associated with training technicians to provide product service and repairs, and difficulties with product support. The multichannel distribution management tool 100 facilitates direct to consumer sales:
  a. in locations where there is no locally-appointed international distributor (often depriving consumers from choice and a manufacturer from making a sale);
  b. when a particular distribution partner (retailer) lacks the relevant or sufficient inventory; and/or
  c. where consumers prefer to purchase directly from a manufacturer.

The multichannel distribution management tool 100 overcomes many of the difficulties associated with shipping and tracking goods to individual consumers, by providing a hosted predictive web-based ordering system (described above—including a sales credit process providing credit to a specified or closest local retailer) and an order tracking and history facility, allowing both manufacturer and end consumer to track the status of an order and delivery. The multichannel distribution management tool 100 allows manufacturers to build brand loyalty among end consumers (by allowing direct sales and sales credits to consumers) without disadvantaging distributors or distribution partners (retailers).

The online RMA facility can also be accessed by end consumers to track repair or returns status (whether returned directly by the consumer or through a retailer). The ready availability of barcode or data matrix scanners (e.g. through smartphone or personal digital assistant applications) allows ready access to scanning technology to upload and update returns data by scanning a product SKU-lifecycle tracker code. This can be done by any party in the distribution chain, including an end consumer.

In an embodiment, the hosted multichannel distribution management system also includes a product service and repair training facility. This provides a remote facility for training, qualifying and certifying technicians, including audiovisual or conferencing technology for close observation of technicians using an approved service kit (e.g. supplied by the manufacturer) to repair or service products.

Manufacturers can also provide interactive, web based training seminars through the distribution system for product support, service and repair. This can be on-demand or at preallocated times, and allows technicians to be locally trained without the need to fly in a trainer (or to fly out a technician) for training.

The product service and repair training facility includes various levels of verification and identification checking. Service kits are sent out through distribution partners for collection by (or distribution to) trainee technicians. Remote training, assessment and qualification of technicians takes place using video-conferencing technologies to ensure that trainees can be supervised, observed and provided with audiovisual feedback. This represents a significant improvement in cost efficiency without a decrease in quality of training and also allows for more frequent training, which represents better overall product support.

Remote or tele-training offers a significant cost and time advantage over traditional methods of technician training. These costs significantly erode profits and make training of local technicians in countries where there are relatively few sales cost-prohibitive.

Master Web-Based Control Panel

Referring to FIG. 1, the multichannel distribution management tool 100 also includes a hosted master control panel 190 to easily manage business operations online from anywhere.

The master control panel 190 enables handling of business operations, including common overseas presence difficulties. This includes:
  a. logistics;
  b. customer service;
  c. international warranty expectations;
  d. non line of sight management;
  e. dynamic currency conversion;
  f. integration of different back end systems.

Other Features

In some embodiments, the multichannel distribution management tool may also include one or more of the following:
  a. a financial reporting module;
  b. an automatic order dispatch integrator to integrate order dispatch with logistics or warehouse operations. The dispatch integrator automatically updates shipping tracking details when items are shipped. Email notifications can also be setup to automatically notify distributors or retail customers;
  c. an on-demand brand support facility, which allows branded product promotional materials (e.g. flyers) to be uploaded and which will automatically be personalized with a distribution partner's logos and contact details, ready to be printed on demand;
  d. a built in Frequently Asked Questions (FAQ) module to allow manufacturers to share resources with all distribution partners (e.g. through its website or otherwise online). The FAQs revealed depend on the log in. There are more technical FAQs that appear for distribution partners and then there is a public set for end customers. This is determined at the point of entry to the back end by a selection feature;
  e. a secure document module to allow sharing of resources and technical documents securely with certain partners, based on login permissions;
  f. a specials support facility, which allows specials (e.g. discounts and rebates) to be enabled for any product and any distribution partner (retailer), including quantity discounts, automatic rebates to encourage more sales, earned credits towards future purchase orders. This facility is made accessible depending on the log in, to ensure that end customers cannot access details intended for distribution partners;
  g. an inventory management tracker for tracking inventory levels in multiple locations automatically and simultaneously;
  h. broader support for distribution partners (retailers) in the form of web based training seminars for product use, dynamic currency adjustments on product pricing to reduce the chance of eroding margins, social media angles to allow distribution partners to promote themselves and their events.

The financial reporting module allows:
  a. tracking of sales trending history, shipping costs, tax costs and other financial data; and
  b. time-stamped currency conversions to allow calculation of true profits in any given currency (by taking into account the costs associated with currency fluctuations at a relevant time).

Figure 4:
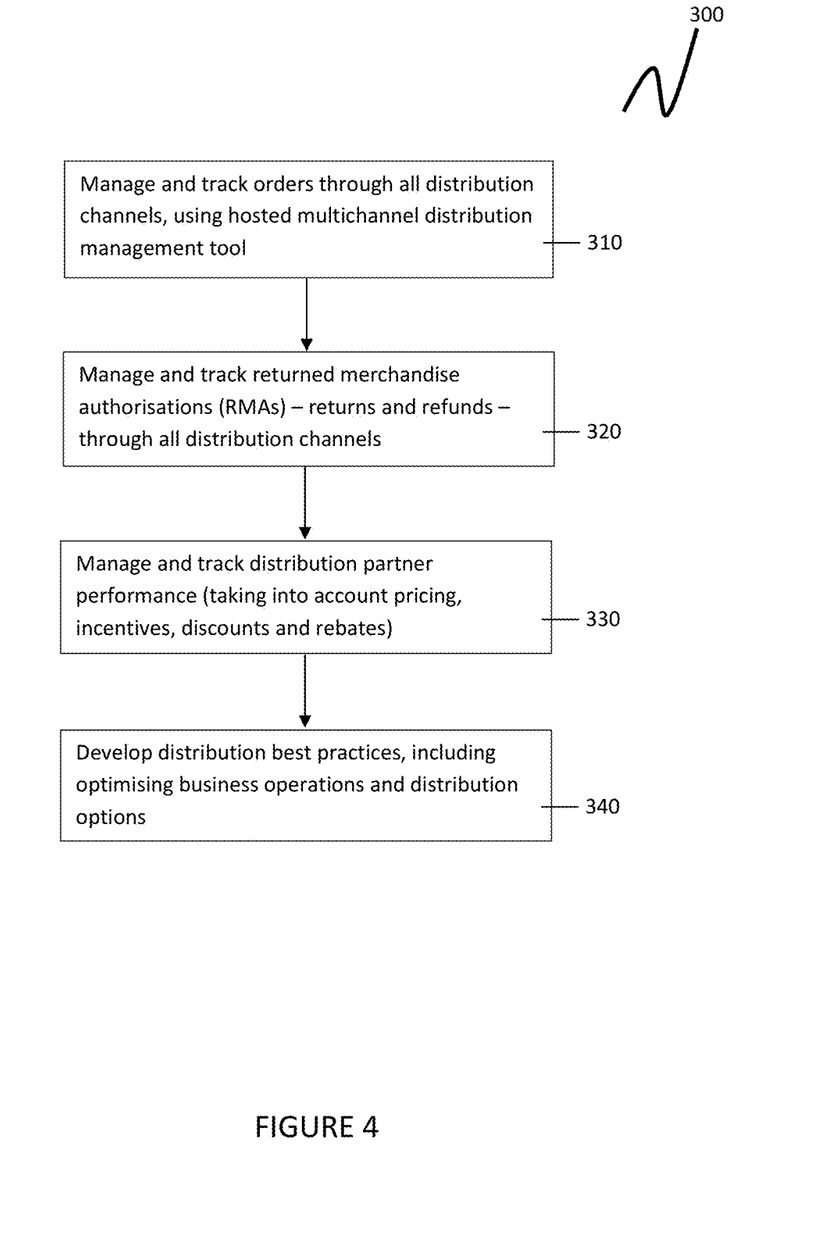
FIG. 4 shows a method for multichannel distribution management as performed by an embodiment of the multi-channel distribution management tool.

Referring to FIG. 4, a computer-enabled method for multichannel distribution management 300 as performed by an embodiment of the multichannel distribution management tool is shown. A manufacturer can manage multichannel distribution operations and transactions including:
  a. order tracking and history through all distribution channels (step 310);
  b. returned merchandise authorizations (RMAs)—returns and refunds—through all distribution channels (step 320);
  c. distribution partner performance (taking into account pricing, incentives, discounts and rebates)—step 330; and
  d. develop distribution best practices, including optimizing business operations and distribution options (step 340).

Steps 310 to 340 can be performed in any order and may be performed in iterative fashion.

Figure 5:
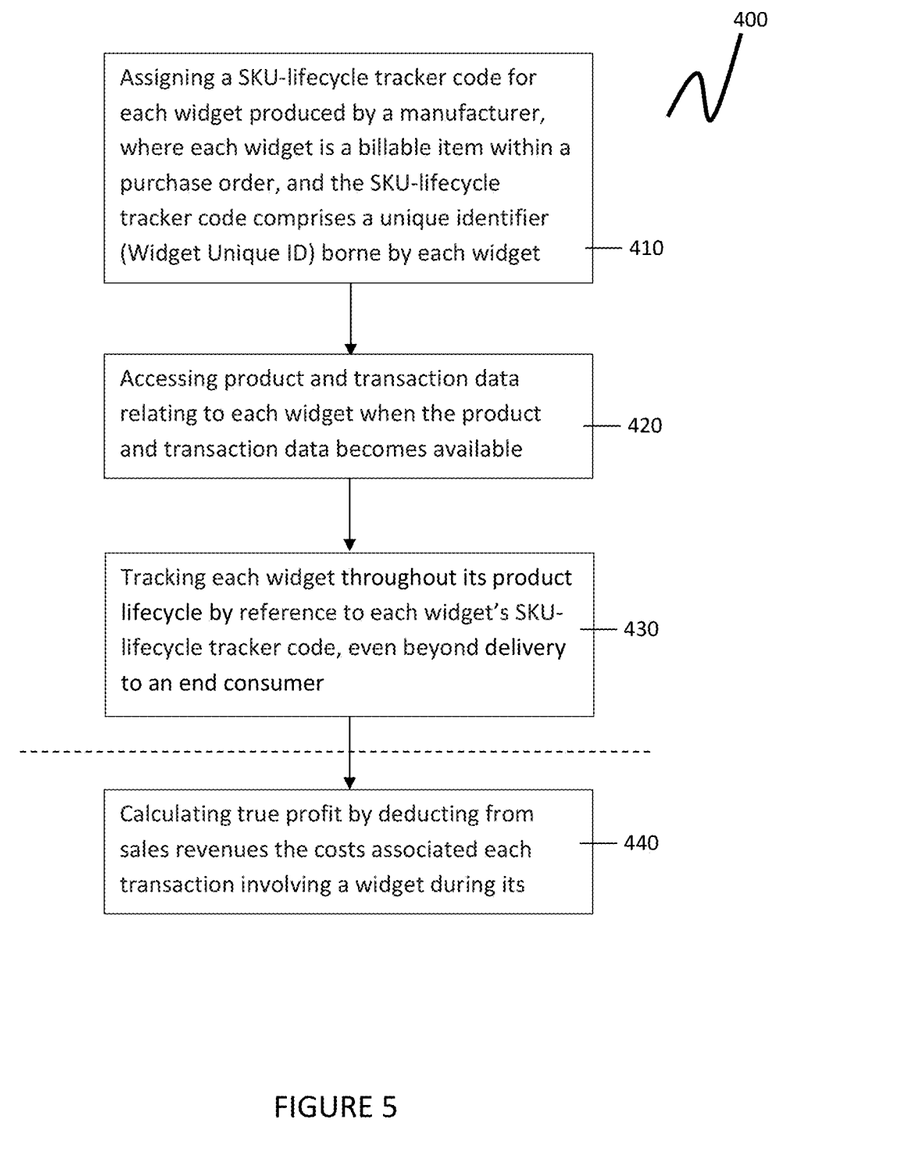
FIG. 5 shows a method for multichannel distribution management as performed by some embodiments of the multichannel distribution management tool.

Referring to FIG. 5, in embodiments, the computer-enabled multichannel distribution management method includes the steps of:
  a. assigning a SKU-lifecycle tracker code for each widget produced by a manufacturer, where each widget is a billable item within a purchase order, and the SKU-lifecycle tracker code comprises a unique identifier (Widget Unique ID) borne by each widget (step 410);
  b. accessing product and transaction data relating to each widget when the product and transaction data becomes available (step 420);
  c. tracking each widget throughout its product lifecycle by reference to each widget's SKU-lifecycle tracker code, even beyond delivery to an end consumer (step 430).

The method may also include the further step (see below the dashed line in FIG. 5) of calculating true profit by deducting from sales revenues the costs associated each transaction involving a widget during its product lifecycle, including costs associated with ongoing liabilities, CRM, currency fluctuations (step 440).

In some embodiments, the distribution management method includes the further steps again of receiving orders from distributors, retail customers and/or end consumers (e.g. through the predictive web-based ordering system); applying a sales credit to a retailer for a direct-to-consumer sale, performing financial modelling and reporting; promoting products and distribution partners, including providing support materials, on-demand and customized support materials (including technical information, product support and frequently asked questions).

An advantage of the preferred embodiments is that it facilitates the multi-channel distribution of product to the market by providing a multi-channel distribution management tool that assists brand owners (manufacturers) to distribute product to the market efficiently and cost-effectively by optimizing business operations for distribution and distribution options. In this way, the multi-channel distribution management tool has the advantage of allowing manufacturers to realize the true profits through efficient management of all cost centers (from promotional activities, discounts and rebates prior to sales, to the cost of ongoing liabilities such as repairs, returns and warranty services and repairs after sales).

A further advantage of the multi-channel distribution management tool is that also facilitates operations and support to distribution partners (retailers) and assists in the efficient delivery of inventory to meet customer interest and demand without increasing the overhead of holding excess inventory.

Yet another advantage of the multi-channel distribution management tool is that it provides a channel for building brand loyalty through meaningful, direct contact (e.g. sales, RMA management) with end consumers without disadvantaging other distribution channels.

The invention provides a multi-channel distribution management tool, system and method for facilitating the distribution of product to market. However, it will be appreciated that the invention is not restricted to this particular field of use and that it is not limited to particular embodiments or applications described herein.

Comprises/comprising when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

What is claimed is:

1. A computer enabled multichannel distribution management tool for facilitating multi-channel distribution of one or more products, the tool including programming instructions embodied in machine readable memory, wherein the multi-channel distribution management tool includes:
   a stock keeping unit (SKU)-lifecycle tracker device,
   wherein the SKU-lifecycle tracker device comprises programming instructions in a computer readable storage medium to:
      (a) automatically generate a SKU-lifecycle tracker code for identifying each widget in a purchase order, the SKU-lifecycle tracker code including a unique identifier (Widget Unique ID) for each said widget produced by a manufacturer, said SKU-lifecycle tracker code to be physically borne by each respective said widget, and wherein each said widget is a billable item within any said purchase order;
      (b) access product data and transaction data relating to said SKU-lifecycle tracker code when said product data and transaction data becomes available, wherein the transaction data accessed by said SKU-lifecycle tracker includes one or more of the following:
         (1) wholesale sales data;
         (2) retail sales data;
         (3) retail (end customer) data;
         (4) order history and tracking data;
         (5) data regarding returned merchandise authorizations (RMAs) for one or more of warranty repairs, refunds, returns or warranty servicing;
         (6) data regarding after sales repairs or long term servicing, including RMA and routine repair management to maintain optimal performance or safety;
      (c) tie said product data and transaction data into the SKU-lifecycle tracker code for each said widget, such that said product and transaction data is available by reference to said SKU-lifecycle tracker code; and
      (d) calculate true profit for any given said widget at any given time in said product lifecycle by deducting one or more of the following costs from sales revenues:
         i. ongoing liabilities;
         ii. customer relationship management (CRM) costs;
         iii. losses from currency fluctuations
      wherein true profit is calculable in relation to one or more of:
         A. any given said widget produced;
         B. one or more distribution channels for said widget in a distribution chain; and
         C. an individual party within a specific distribution channel for said widget, including one of the following: a distributor, a distribution partner (retailer), an end consumer,
   such that the multichannel distribution management tool is configured to record and manage transaction data for each transaction relating to any given said widget over time and throughout said widget's product lifecycle,
   such that the multichannel distribution management tool is capable of:
      (i) tracking costs associated with ongoing liabilities, wherein said ongoing liabilities include RMAs and routine repair management; and
      (ii) deducting costs associated with ongoing liabilities from sales revenues to determine true profit;
   wherein the multichannel distribution management tool allows said product data, transaction data and true profit calculations to be accessible to one or more parties within a product distribution chain by scanning said SKU-lifecycle tracker code using a suitable code scanner such that the multichannel distribution management tool is capable of managing and tracking transactions relating to one or more widgets within a product distribution chain, including beyond delivery to an end consumer;
   wherein the tool further includes one or more of the following:
      (a) a real-time currency converter;
      (b) time-stamped currency conversions
   such that the tool is configured to take into account currency fluctuations at a relevant time in calculating true profits in any given currency;
   wherein the tool further includes a multi-dimensional order tracking and history facility, wherein the multi-dimensional order tracking and history facility communicates with other components of the multichannel distribution management tool, including:

(a) a distribution partner management facility for recording data regarding distribution channels and distribution options, including sales data regarding individual distributors (including distribution partners); and
(b) a hosted master control panel accessible online from anywhere,
wherein said multi-dimensional order tracking and history facility includes programming instructions in a computer readable storage medium, said instructions enabling user input and management of product distribution transactions, including by reference to said SKU-lifecycle tracker code;
wherein the tool further includes a predictive web based ordering system comprising programming instructions that enable selection by an operator including a retailer to perform one or more of the following:
(a) generate a purchase order based on user settable criteria, wherein the user settable criteria include sales data based on order history;
(b) generate a purchase order for a widget that lacks an order history based on manufacturer sales data;
(c) place an order for a product on its own behalf or on behalf of a consumer such that the retailer can secure a sale, even if it lacks the inventory to fulfil the order;
(d) receive a sales credit for a direct-to-consumer sale by a manufacturer, such that said sale continues to benefit the retailer while providing a consumer a choice to buy direct from the manufacturer; and
wherein the predictive web based ordering system further includes programming instructions that enable an operator, including a consumer, to purchase directly from a manufacturer by accessing a manufacturer web site such that a sale can be secured:
(a) in one or more locations where there is no locally-appointed international distributor;
(b) when a particular distribution partner (retailer) lacks the relevant or sufficient inventory; and/or
(c) where an operator such as a consumer prefers to purchase directly from a manufacturer; and
wherein the predictive web based ordering system further includes programming instructions for a sales credit process for crediting a consumer sale to a particular distribution partner (retailer), using a database of the physical locations of each of a plurality of distribution partners (retailers), wherein the predictive web based ordering system collects, through the manufacturer website, either:
(1) a nomination by the operator for the particular distribution partner (retailer) to receive the credit; or
(2) the operator's address;
wherein, if the operator does not provide the nomination, the programming instructions automatically credits the sale by accessing the database, comparing the operator's address to the database of the physical locations and assigning a sales credit to the particular distribution partner (retailer) that has a physical location closest to the operator's address.

2. The multichannel distribution management tool of claim 1 wherein the SKU-lifecycle tracker code borne by each said widget is encoded to include:
(a) transaction data involving a specific Widget Unique ID; and
(b) product data
such that said transaction and product data are made accessible at any time during said widget's entire product lifecycle and from any location by scanning said SKU-lifecycle tracker code using a code scanner, said SKU-lifecycle tracker code thereby also facilitating detection of grey market or other unauthorised selling of product, including counterfeit product.

3. The multichannel distribution management tool of claim 1 wherein the SKU-lifecycle tracker code may take any suitable form, including:
(a) a data matrix code;
(b) one or more barcodes; or
(c) any other suitable code or tag.

4. The multichannel distribution management tool of claim 1 wherein the transaction data further includes customer relationship management (CRM) data regarding one or more of:
(a) promotional spend;
(b) advertising spend;
(c) an incentive;
(d) a discount;
(e) a rebate;
(f) other customer relationship management (CRM) costs, such that the multichannel distribution management tool is capable of:
(i) tracking costs associated with CRM; and
(ii) deducting costs associated with CRM from sales revenues to determine true profit in relation to one or more of:
1. a widget produced;
2. one or more distribution channels in a distribution chain;
3. an individual party within a specific distribution channel, including one of the following: a distributor, a distribution partner (retailer), an end consumer.

5. The multichannel distribution management tool of claim 1, wherein the order history and tracking data includes one or more of:
(a) one or more locations of a widget the subject of an RMA;
(b) status of the RMA.

6. The multichannel distribution management tool of claim 1 wherein the product data include one or more of the following:
(a) universal product code (UPC), or any other suitable code or tag containing product data;
(b) weight;
(c) serial number;
(d) country of origin;
(e) product name;
(f) product dimensions;
(g) product color;
(h) other product details including one or more of: photographic or videographic data, product stock levels, sales data.

7. The multichannel distribution management tool of claim 1 wherein the multidimensional order tracking and history facility allows one or more parties in a distribution chain, including:
(a) a manufacturer;
(b) a distributor of the manufacturer (whether wholesale or retail); and
(c) a customer of the manufacturer (whether retail customers or end consumers), to manage its respective transactions within the distribution chain by viewing and/or updating order tracking and history data, including:
(i) pending and past orders;

(ii) order status and tracking;
(iii) widget tracking (through the SKU-lifecycle tracker);
(iv) direct sales;
(v) inventory control;
(vi) order fulfillment;
(vii) returned merchandise authorization (RMA) repairs and returns information.

8. The multichannel distribution management tool of claim 1 wherein multidimensional order tracking and history facility is further configured to provide one or more different dimensions (views) of order tracking and history data within said distribution chain,
wherein said one or more different dimensions contain order tracking and history data relating to said one or more parties in the distribution chain, and
wherein access to each said one or more different dimensions depends on a relative position in the distribution chain of a party (information seeker) seeking to access said order tracking and history data contained in a specific dimension.

9. The multichannel distribution management tool of claim 8 wherein access to each said one or more different dimensions in the multi-dimensional order tracking and history facility is controlled according to an access status applicable to the information seeker, wherein said access status limits access to one or more of the following:
(a) internal information, said internal information comprising order tracking and history data relevant to the information seeker and its own transactions;
(b) external information, said external information comprising order tracking and history data relevant to one or more downstream customers of the information seeker.

10. The multichannel distribution management tool of claim 9 wherein the multidimensional order tracking and history facility is configured to allow toggling between each said one or more different dimensions such that a display of internal information relating to an information seeker can be alternated with a display of external information relating to one or more of said information seeker's downstream customers.

11. The multichannel distribution management tool of claim 1 wherein the multidimensional order tracking and history facility further includes a multi-dimensional online returned merchandise authorization (RMA) facility to manage and track the returns process.

12. The multichannel distribution management tool of claim 11 wherein the multidimensional online RMA facility is further configured to enable display of order tracking and history data in one or more of the following dimensions:
manufacturer-dimension, wherein said manufacturer-dimension displays one or more of:
(a) data relating to RMAs sent from all distribution channels across the distribution chain to a manufacturer;
(i) all RMAs sent from an individual distribution party to the manufacturer;
(b) distributor-dimension, wherein said distributor-dimension displays data relating to RMAs sent by an individual distributor to the manufacturer;
(c) retailer-dimension, wherein said retailer-dimension displays data relating to RMAs sent by an individual retailer to the manufacturer;
(d) customer-dimension, wherein said customer-dimension displays data relating to RMAs sent by an individual customer to the manufacturer.

13. The multichannel distribution management tool of claim 11 further including a report generator for generating one or more reports of one or more of the following:
(a) pending RMAs and RMA history, including one or more of the following:
(i) RMA trending information;
(ii) individual distributor history of RMAs
(iii) costs associated with each RMA; and
(b) order status, including RMA status;
(c) distribution data, wherein the distribution data includes one or more of trending information, business transaction performance data, distribution channel performance data, by a user of the tool.

14. The multichannel distribution management tool of claim 1 wherein the distribution partner management facility is configured to enable:
(a) recording of statistics;
(b) analyses across a product distribution chain;
(c) financial modeling and reporting;
(d) promotion of:
(i) one or more products; and
(ii) one or more distribution partners,
wherein said promotion comprises one or more of providing distribution partners with product and technical support materials, including on-demand and customized support materials.

15. The multichannel distribution management tool of claim 14 wherein the analyses regarding the product distribution chain includes one or more of the following:
(a) the extrapolation of trending information from transaction data relating to
(i) one or more distribution channels in a distribution chain;
(ii) an individual party within a specific distribution channel;
(b) performance reviews between and across distribution channels and of individual distributors, including retailers, within a channel; and
(c) management of multi-channel distribution options to determine best practices and to optimize business transactions across the distribution chain;
(d) tracking of promotional spend and discount and rebate data through each distribution channel and for each party within a specific distribution channel such that the multichannel distribution management tool is capable of calculating a cost of making sales through various distribution channel(s) or parties within a channel.

16. The multichannel distribution management tool of claim 1 wherein the hosted master control panel is configured to receive user input and enable control of management, tracking and analysis of product distribution transactions, including one or more of:
(a) logistics;
(b) customer service;
(c) international warranty expectations;
(d) non line of sight management;
(e) dynamic currency conversion;
(f) integration of different back end systems.

17. The multichannel distribution management tool of claim 1 wherein the tool further includes programming instructions to enable performance of a method for multichannel distribution management.

18. The multi-channel distribution management tool of claim 1 further including a remote product service and repair training facility for training, qualifying and certifying technicians.

19. The multi-channel distribution management tool of claim 18, wherein the service and repair training facility includes one or more of:
(a) audiovisual technology;
(b) conferencing technology;
(c) training seminars,
such that one or more technicians using a service kit approved by the manufacturer can be trained, assessed and qualified remotely to do one or more of repair or service products, or provide product support.

20. The multi-channel distribution management tool of claim 19, wherein the training seminars are accessible in one or more of the following ways:
(a) on-demand;
(b) at preallocated times.

21. The multi-channel distribution management tool of claim 1 further comprising a means for applying the SKU-lifecycle tracker code to the respective widget.

22. The multi-channel distribution management tool of claim 21 wherein the means for applying is an adhesive label printer.

23. The multi-channel distribution management tool of claim 21 wherein the means for applying is a surface marking device.

24. The multi-channel distribution management tool of claim 23 wherein the surface marking device is an selected from the group consisting of an industrial ink jet printer, a dot-peen marker, a laser marker, and an electrolytic chemical etcher.

* * * * *